United States Patent [19]
Nishimura et al.

[11] Patent Number: 5,470,106
[45] Date of Patent: Nov. 28, 1995

[54] AIR BAG HAVING A HIGH BURST STRENGTH

[75] Inventors: Kunio Nishimura, Ibaraki; Hideo Nakagawa, Takatsuki; Nobuo Takahashi, Ikoma, all of Japan

[73] Assignee: Teijin Limited, Osaka, Japan

[21] Appl. No.: 211,500

[22] PCT Filed: Aug. 19, 1993

[86] PCT No.: PCT/JP93/01162

§ 371 Date: Apr. 7, 1994

§ 102(e) Date: Apr. 7, 1994

[87] PCT Pub. No.: WO94/04396

PCT Pub. Date: Mar. 3, 1994

[30] Foreign Application Priority Data

Aug. 19, 1992 [JP] Japan .................................. 4-241410

[51] Int. Cl.$^6$ .................................................. B60R 21/16
[52] U.S. Cl. .................................................. 280/743.1
[58] Field of Search .............................. 280/728 R, 743 R, 280/728.1, 743.1, 743.2, 728.2, 730.2, 730.1, 731, 732, 734, 741

[56] References Cited

U.S. PATENT DOCUMENTS

| | | | |
|---|---|---|---|
| 5,033,771 | 7/1991 | Miyauchi et al. | 280/728 R |
| 5,290,059 | 3/1994 | Smith et al. | 280/741 |
| 5,294,148 | 3/1994 | Imai | 280/743 R |

FOREIGN PATENT DOCUMENTS

| | | | |
|---|---|---|---|
| 54-3484 | 2/1979 | Japan | 280/743 R |
| 2-90170 | 3/1990 | Japan. | |
| 4-43143 | 1/1992 | Japan. | |
| 4-5145 | 1/1992 | Japan. | |
| 4092737 | 3/1992 | Japan | 280/728 R |

Primary Examiner—Margaret A. Focarino
Assistant Examiner—Paul N. Dickson
Attorney, Agent, or Firm—Burgess, Ryan & Wayne

[57] ABSTRACT

The air bag of the present invention having an excellent burst strength is formed from substantially circular bottom and top cloths each consisting of a woven fabric, the bottom cloth is reinforced with an apron formed from a woven fabric, arranged around a hole for connecting an inflator to the air bag and seam-joined to the bottom cloth, the apron has an outermost circumferential seam line in a quadrilateral form such as a substantially regular square, rhombic or rectangular form, preferably a regular square form, having the same center point as that of the inflator-connecting hole, and the outermost circumferential quadrilateral seam line satisfies the requirements (1) and (2):

(1) in an imaginary circle having a diameter Dw and drawn around the same center as that of the inflator-connecting hole on the apron in such a manner that at least one pair of vertexes of the outermost quadrilateral seam line, spaced at a largest diagonal distance from each other is inscribed in the imaginary circle, a ratio of each of straight line distance Da and Db between one of the inscribed vertexes and each of two vertexes adjacent to the inscribed vertex to the diameter Dw is 0.6/1 to 0.9/1, and (2) a ratio of each of Da and Db to a diameter De of the circular bottom cloth is 0.5/1 or less.

9 Claims, 6 Drawing Sheets

AIR BAG HAVING A HIGH BURST STRENGTH

TECHNICAL FIELD

The present invention relates to an air bag having an excellent burst strength. More particularly, the present invention relates to an air bag in which a portion thereof surrounding a hole for connecting an inflator to the air bag is reinforced with an apron so as to exhibit a high burst strength, the air bag exhibiting a high degree of safety when quickly inflated by an inflation gas.

BACKGROUND ART

Recently, air bag systems have become practically employed as a safety device for protecting the occupants of an automobile. Usually, an air bag which was produced by coating a surface of a smooth woven fabric with a chloroprene rubber or silicone rubber, cutting the coated fabric into a circular form, superposing two cut fabric pieces on each other and seam-joining the fabric pieces at the circumferential edge portions thereof, is used.

Since the air bag is used by inflating it with a gas blown in an instant thereinto, the air bag is required to have no risk of bursting by a rapid raising of the inside pressure thereof. For meeting the requirement, various attempts were made. For example, Japanese Unexamined Patent Publication (Kokai) No. 2-90,170 attempted to provide an air bag produced by preparing non-circular woven fabric pieces having larger distances between a center point and a circumferential edge thereof measured in longitudinal directions of the warp and weft yarns than distances between the center and the circumferential edge thereof measured in a direction inclined at an angle of from 40 to 50 degrees from the longitudinal direction of the warp yarns to the longitudinal direction of the weft yarns; superposing the non-circular woven fabric pieces on each other; and seam-joining the pieces at the circumferential edge portions thereof.

Also, Japanese Unexamined Patent Publication (Kokai) No. 4-5,145 discloses a non-circular air bag made from hollow weave fabrics having an axis length thereof in a direction at a bias angle of 45 degrees from the warp direction, corresponding to 70 to 95% of the axis length thereof in the warp and weft direction.

Further, Japanese Unexamined Patent Publication (Kokai) No. 4-43,143 discloses an air bag made from non-circular hollow weave fabric pieces having a longer axis in a direction inclined at a bias angle from the warp or weft direction than an axis in the warp or weft direction of the fabric pieces.

The above-mentioned attempts are based on the idea that a starting point in bursting of the air bag resides in a seam-joining portion in a circumferential edge portion of the air bag, and provided an air bag made from non-circular woven fabric pieces having a shorter axis in a bias direction than that in the warp or weft direction, to enhance the burst strength of the seam-joining portion.

In another attempt, not using non-circular woven fabric pieces, two circular woven fabric pieces as mentioned above are superposed on each other and seam-jointed at circumferential edge portions thereof to each other. In this attempt, a portion of an inflator side woven fabric piece, namely of a bottom cloth, surrounding a hole for connecting an inflator to the air bag therethrough, is reinforced with a woven fabric apron, to prevent a bursting and perforating of the bottom cloth by the inflation gas.

Nevertheless, the above-mentioned prior art air bags are not satisfactory in burst strength, and thus a further enhancement of the burst strength is required. Especially, the demand is very strong for lightweight, compact air bags.

DISCLOSURE OF THE INVENTION

An object of the present invention is to provide an air bag, in which a portion thereof surrounding a hole for connecting an inflator to the air bag is reinforced by an apron seam-joined thereto, having a high burst strength and an excellent degree of safety.

The above-mentioned object can be attained by the air bag of the present invention.

The air bag of the present invention having a high burst strength comprises a bottom cloth and a top cloth each formed from a circular woven fabric piece, superposed on each other, and seam-joined to each other at a circumferential edge portion thereof, the circular bottom cloth having a hole formed in the center portion thereof, through which an inflator can be connected to the air bag, and having a circumferential portion thereof surrounding the inflator-joining hole and reinforced with an apron made from a woven fabric piece and seam-joined to the bottom cloth, wherein an outermost circumferential seam line on the apron is in a quadrilateral form selected from substantially regular square, rhombic and rectangular forms, having the same center point as that of the inflator-connecting hole; the outermost circumferential quadrilateral seam line having a pair of sides extending in parallel to each other and substantially parallel to the direction of warp or weft yarns in the bottom cloth, and satisfying the requirements (1) and (2):

(1) when an imaginary circle having a diameter Dw is drawn around the same center point as that of the inflator-connecting hole on the apron in such a manner that at least one pair of vertexes of the outermost circumferential quadrilateral seam line, spaced at a largest diagonal distance from each other is inscribed in the imaginary circle, a ratio of each of straight line distances Da and Db between one of the vertexes inscribing in the imaginary circle and each of two vertexes adjacent to the above-mentioned vertex to the diameter Dw of the imaginary circle is in a range of from 0.6:1 to 0.9:1; and (2) a ratio of each of the distances Da and Db to a diameter De of the circular bottom cloth is 0.5:1 or less.

DESCRIPTION OF THE PREFERRED EMBODIMENTS

Figure 1:
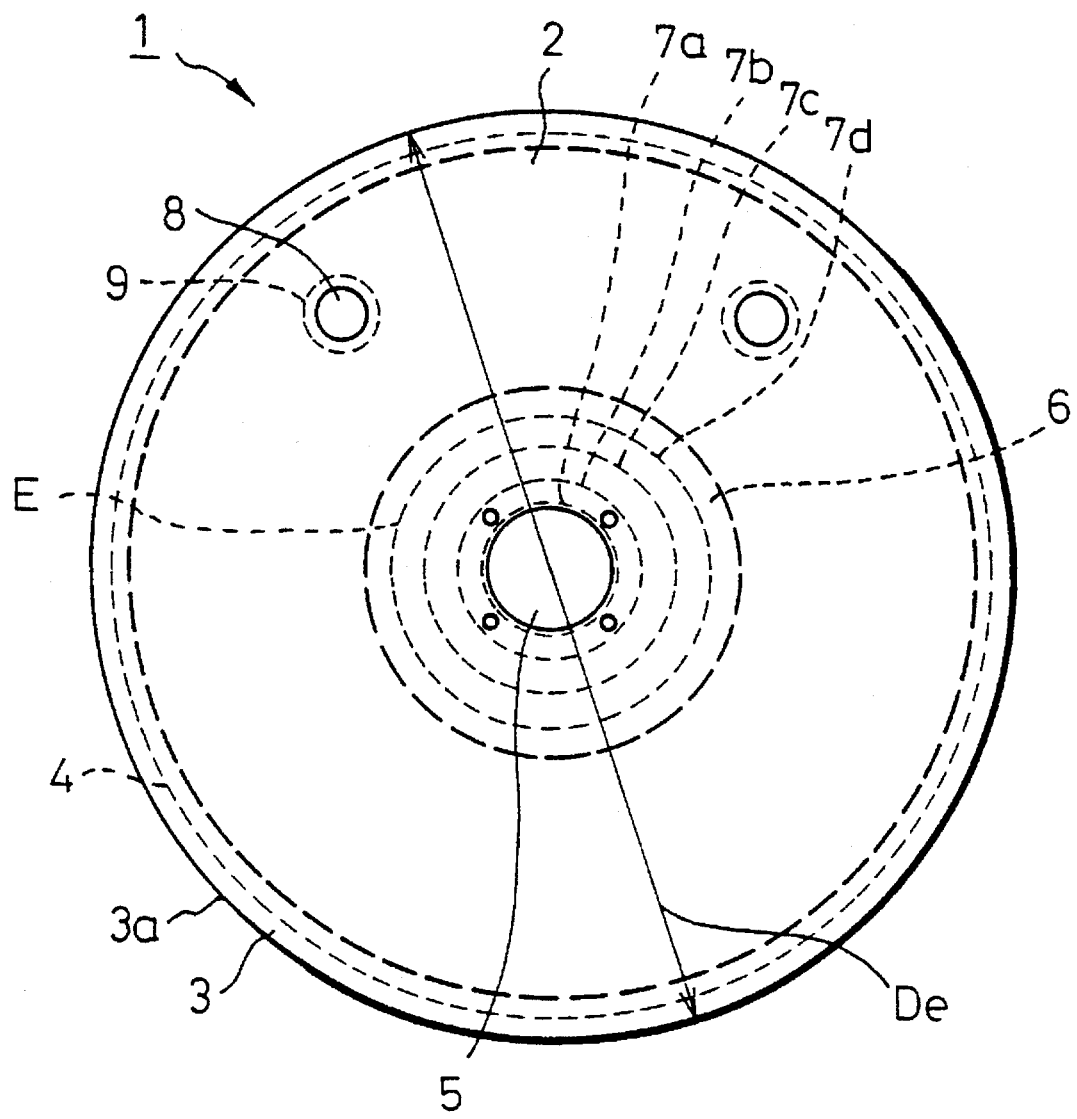
FIG. 1 is an explanatory view of an inside back face of a bottom cloth of a conventional air bag having reinforcing apron seam-joined to a portion of the bottom cloth surrounding a hole for connecting an inflator to the air bag therethrough.

In an embodiment of the conventional air bag indicated in FIG. 1, an air bag 1 is made up from a circular bottom cloth 2 and a circular top cloth (not shown in the drawing) superposed on the bottom cloth 2.

Circular circumferential edge portions 3 of the top cloth and the bottom cloth 2 superposed on the top cloth are respectively turned inward so as to form a circular circumferential edge 3a, and the turned edge portions are seam-joined to each other along a seam line 4 so that the circular top cloth and the circular bottom cloth are sealed airtight by the seam-joint.

Referring to FIG. 1, a hole 5 for connecting an inflator is formed in a center portion of the circular bottom cloth 2. On a portion of an inside face of the circular bottom cloth surrounding the inflator-connecting hole 5, an annular apron 6, which is concentric with the circular bottom cloth 2, is seam-joined to reinforce the portion of the circular bottom cloth. The reinforcing apron 6 is seamed onto an inside face of the bottom cloth 2 along a plurality of concentric circular seam lines 7a to 7d.

Also, in the bottom cloth 2, a plurality of vent holes 8 are formed to appropriately control an inside pressure of the air bag inflated with an inflation gas introduced into the air bag, by allowing a portion of the inflation gas to be discharged therethrough. Portions of the bottom cloth surrounding the vent holes 8 are reinforced by reinforcing aprons 9 seam-joined thereto.

The bottom cloth, top cloth, and reinforcing aprons are made up from woven fabric pieces which are of the same type as or a different type from each other.

With respect to the air bag having the constitution as shown in FIG. 1, the inventors of the present invention observed and studied in detail the bursting behavior of the air bag when an inflation gas is introduced thereinto. As a result, it was found that a starting point of the burst of the air bag 1 is generated not in the circular circumferential edge portion 3 of the air bag but rather along an outermost circumferential seam line 7d of the reinforcing apron. Namely, it was found that the starting point of the burst of the air bag is generated in a seam line 7d located outermost circumferential position in a plurality of concentric circular seam lines 7a to 7d different in diameter from each other, on the reinforcing apron seam-joined to the inside face of the bottom cloth 2, the burst line is further extended outward, and the expanding direction of the burst line always corresponds to the direction of the warp or weft yarns from which the bottom cloth is formed: This phenomenon suggests that with respect to the plurality of concentric circular seam lines in the reinforcing apron in the conventional air bag, the outermost circumferential seam portion of the bottom cloth exhibits the lowest burst strength, and a resistance of the bottom cloth to a tension which causes the burst line of the bottom cloth to be further extended is relatively high in a bias direction of the bottom cloth and relatively low in a warp and/or weft direction of the bottom cloth.

In the air bag of the present invention, when a reinforcing apron is seam-joined to a portion of the inside face of the bottom cloth surrounding an inflator-connecting hole, along a plurality of seam lines, the outermost circumferential seam line on the reinforcing apron is formed in a quadrilateral form selected from substantially regular square, rhombic and rectangular forms having a center point thereof corresponding to the center point of the inflator-connecting hole of the bottom cloth.

Also, in the air bag of the present invention, the centermost circumferential quadrilateral seam line is formed so as to satisfy the requirements (1) and (2) mentioned hereinafter.

It was found that when the outermost circumferential seam line is formed in the manner as mentioned above, the burst strength of the outermost circumferential seam portion of the reinforcing apron can be significantly enhanced and the formation of the burst-starting point can be prevented.

In the air bag of the present invention, the requirements which must be attained by the outermost circumferential seam line on the reinforcing apron are as follows.

(1) In the reinforcing apron having the outermost circumferential seam line in a quadrilateral form selected from substantially regular square, rhombic and rectangular forms and having a center point thereof corresponding to that of the inflator-connecting hole, when an imaginary circle having a diameter Dw is drawn around a center point corresponding to that of the inflator-connecting hole in such a manner that at least one pair of vertexes of the outermost circumferential quadrilateral seam line, spaced at a largest diagonal distance from each other is inscribed in the imaginary circle, a ratio of each of straight line distance Da and Db between one of the vertexes inscribed in the imaginary circle and each of two vertexes adjacent to the above-mentioned vertex to the diameter Dw of the imaginary circle, namely Da/Dw and Db/Dw, is in a range of from 0.6:1 to 0.9:1, preferably 0.65:1 to 0.85:1.

(2) A ratio of each of the distance Da and Db to a diameter De of the circular bottom cloth, namely Da/De and Db/De is 0.5:1 or less.

Figure 2:
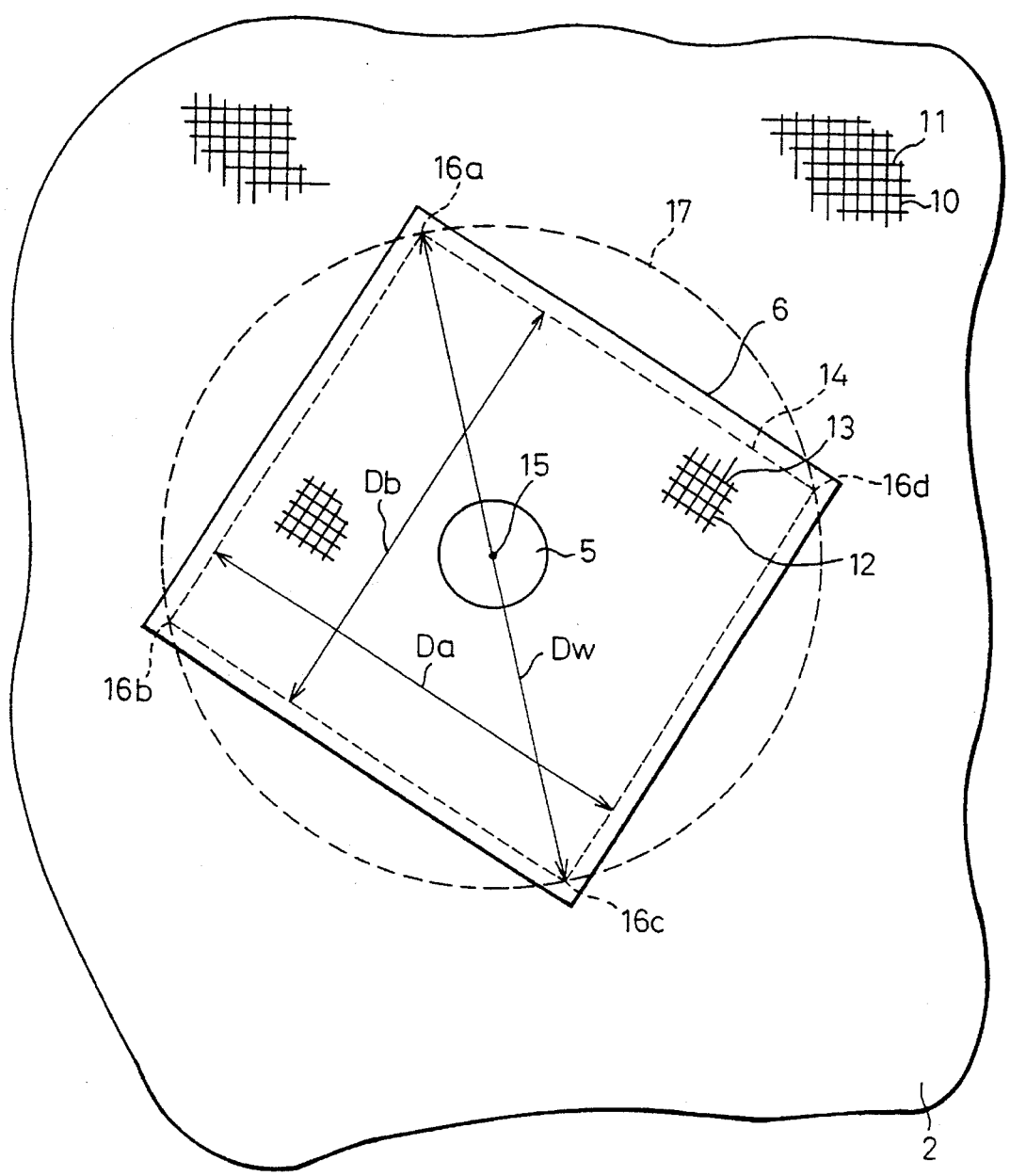
FIG. 2 is an explanatory partial view of an inside back face of a bottom cloth of an embodiment of the air bag of the present invention, in which an embodiment of seam lines on a reinforcing apron seam-joined to a portion of the bottom cloth surrounding a hole for connecting an inflator to the air bag therethrough, is in the form of a square.

Referring to FIG. 2, a bottom cloth 2 is formed from a woven fabric piece constructed by warp yarns 10 and weft yarns 11, an inflator connecting hole 5 is formed in the center portion of the bottom cloth 2, and a reinforcing apron 6 made from warp yarns 12 and weft yarns 13 is seam-joined to a portion of the bottom cloth surrounding the inflator-connecting hole.

In FIG. 2, an outermost circumferential seam line 14 on the reinforcing apron 6, which can be formed in a quadrilateral form selected from substantially regular square, rhombic and rectangular forms, is in a regular square form, and has a center point 15 corresponding to the center point of the inflator-connecting hole 5. Now, an imaginary circle 17 having a diameter Dw is drawn around the center point 15 corresponding to that of the inflator-connecting hole 5 in such a manner that four vertexes 16a, 16b, 16c and 16d of the outermost circumferential quadrilateral seam line 14 are inscribed in the imaginary circle 17. In this case, it is necessary for the air bag of the present invention that a ratio of each of straight line distances Da and Db between one of the vertexes, for example, a vertex 16a, and each of two vertexes, for example, a vertex 16b or 16d, of the outermost circumferential quadrilateral seam line 14 inscribed in the imaginary circle 17, to the diameter Dw of the imaginary circle 17, namely a ratio Da/Dw or Db/Dw, be in the range of from 0.6:1 to 0.9:1.

In this case, the diameter Dw of the imaginary circle 17 corresponds to a diagonal line through which two vertexes 16a and 16c facing each other of the outermost circumferential quadrilateral seam line are connected to each other, and/or a diagonal line connecting a vertex 16b to a vertex 16d.

If at least one of the ratios Da/Dw and Db/Dw falls outside of the range of from 0.6:1 to 0.9:1, when an inflation gas is introduced into the air bag, the burst-starting points are concentrically generated in the outermost circumferential seam portion of the reinforcing apron only in the warp and weft directions of the bottom cloth and thus the burst strength of the air bag is reduced.

Generally, where a seam line on a woven fabric is formed at a right angle to a direction of a tension applied to the woven fabric, the tensile seam strength of the woven fabric becomes highest when the seam line is inclined at a bias angle of 45 degrees to the warp or weft direction of the woven fabric. Also, the tensile seam strength of the woven fabric becomes lowest when the seam line is formed at a right angle to the warp or weft direction of the woven fabric.

In the present invention, when the ratios Da/Dw and Db/Dw are in the range of from 0.6:1 to 0.9:1, the direction of each side of the outermost circumferential quadrilateral seam line on the apron intersect the warp and weft directions of the bottom cloth. In this case, even if the burst-starting points are concentrically generated on the outermost circumferential quadrilateral seam line, this outermost circumferential seam portion of the apron can exhibit an excellent burst strength.

Also, as shown in FIG. 2, the direction of the warp yarns 10 of the bottom cloth 2 and the direction of warp yarns 12 of the reinforcing apron 6 are preferably not parallel to each other, more preferably make a bias angle of 30 to 60 degrees.

By arranging the bottom cloth 2 and the apron 6 in the above-mentioned manner, a tension applied to the air bag when inflated, is substantially evenly absorbed and borne in directions of the warp and weft yarns of the bottom cloth 2 and the reinforcing apron and in the bias direction, and the burst strength-enhancing effect created by adjusting the ratios Da/Dw and Db/Dw to a range of from 0.6:1 to 0.9:1 is further enhanced.

When an inflation gas is blown into an air bag, the bursting tension is concentrically applied to an outermost circumferential seam line portion of the reinforcing apron, and the tension acts so as to expand the outermost circumferential seam line portion outward, namely in a direction toward the outer circumferential edge of the apron. Generally, an ultimate elongation of a woven fabric in a bias direction is larger than that in a warp or weft direction thereof.

In a preferable embodiment of the air bag of the present invention, when the outermost circumferential seam line of the reinforcing apron in the form of a quadrilateral selected from substantially regular square, rhombic and rectangular forms is formed in such a manner that the warp and weft directions of the reinforcing apron respectively intersect the warp and weft directions of the bottom cloth, and the diagonal lines of the outermost circumferential seam line in the substantially regular square, rhombic or rectangular form intersect the warp and weft directions of the reinforcing apron and thus extend in the bias direction of the apron, as shown in FIG. 2, the four sides of the outermost circumferential quadrilateral seam line of the reinforcing apron never intersect the warp and weft directions of the bottom cloth at an angle of or close to 90 degrees. Also, since the ratios Da/Dw and Db/Dw are in the above-mentioned range, the tension applied in the warp and weft directions of the bottom cloth and in the warp and weft directions of the reinforcing apron can be absorbed by elongation of the bottom cloth and the reinforcing apron in the bias directions thereof and thus evenly distributed in the entire outermost circumferential seam line portion of the reinforcing apron. As a result, the bursting inside pressure of the air bag applied to the outermost circumferential seam line of the reinforcing apron can be evenly distributed throughout and borne by the entire outermost circumferential seam line, and thereby the generation of the burst-starting points in the outermost circumferential seam line portion is prevented and the burst strength of the air bag is enhanced.

As long as the object of the present invention is attained, however, the direction of warp yarns of 10 of the bottom cloth 2 and the direction of the warp yarns 12 of the reinforcing apron 6 may be in parallel to each other and the diagonal line of the outermost circumferential seam line in a substantially rectangular form, of the reinforcing apron may be in parallel to one of the warp and weft directions of the reinforcing apron.

Generally, it is preferable that each pair of sides parallel to each other, of the outermost circumferential regular square, rhombic or rectangular seam line of the apron 6, be parallel to the direction of the warp yarns 12 or weft yarns 13 of the apron 6, as indicated in FIG. 2.

Figure 3:
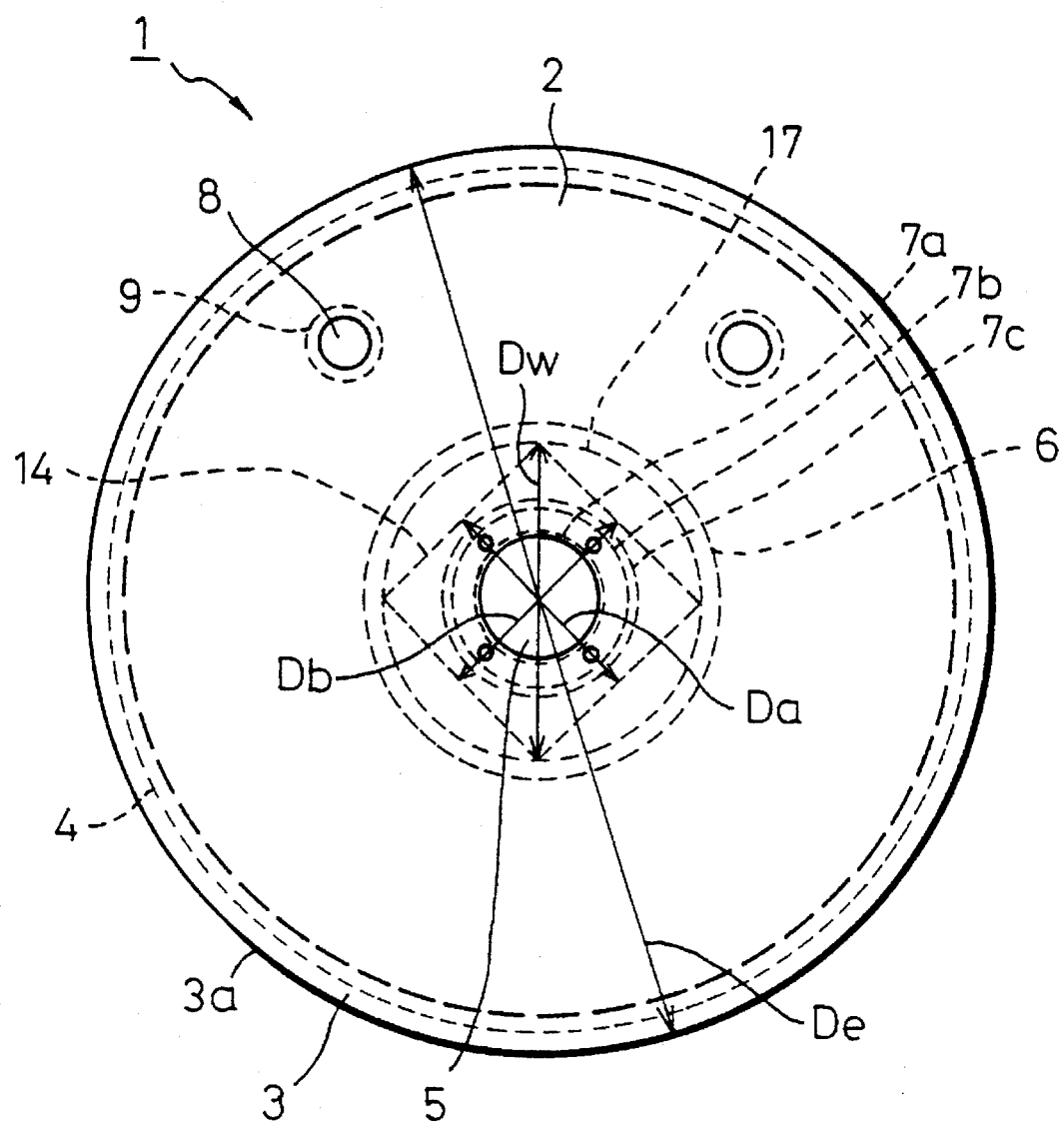
FIG. 3 is an explanatory view of an inside back face of a bottom cloth of another embodiment of the air bag of the present invention having a reinforcing apron seam-joined to a portion of the bottom cloth surrounding a hole for connecting an inflator to the air bag therethrough.
Figure 4:
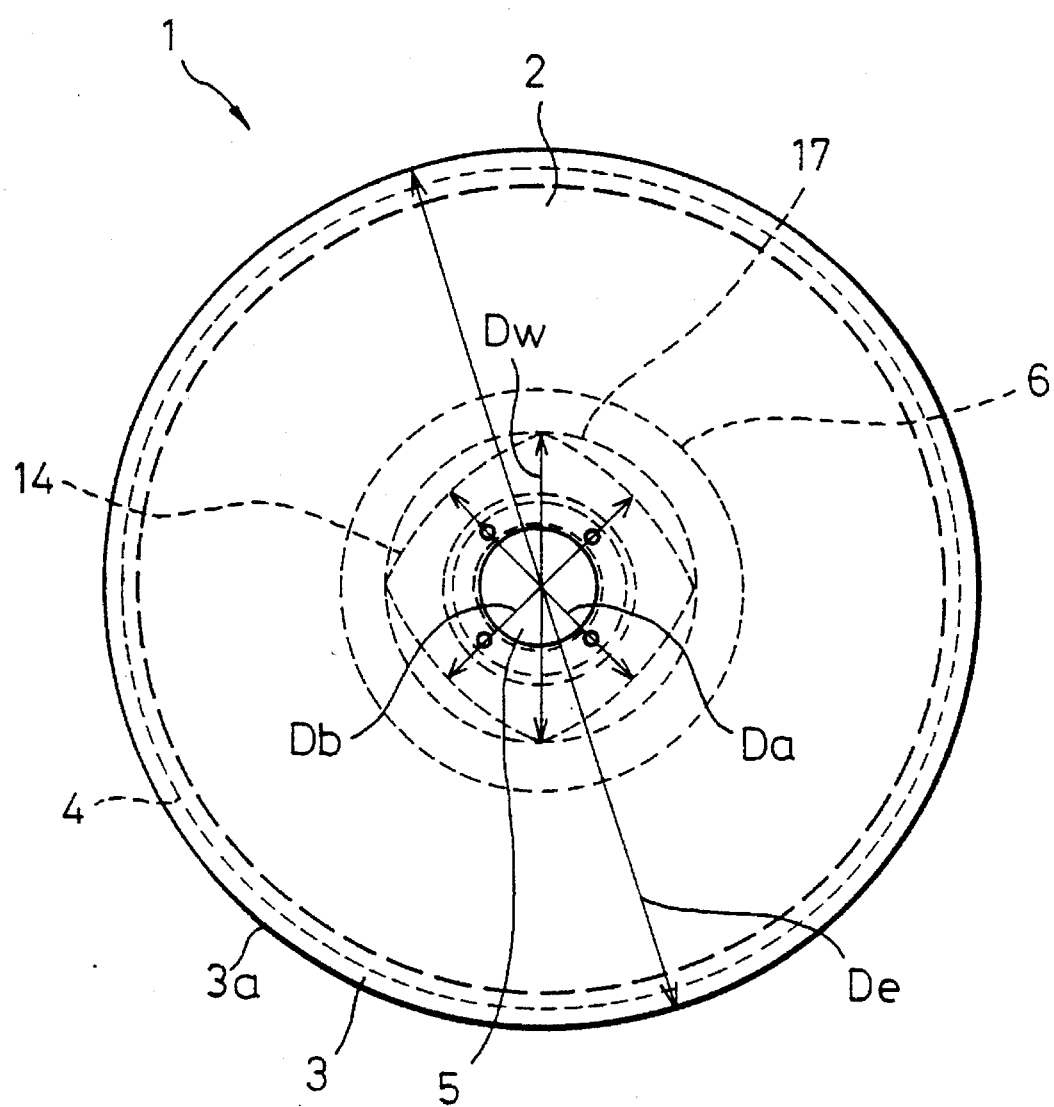
FIG. 4 is an explanatory view of an inside back face of a bottom cloth of another embodiment of the air bag of the present invention having a reinforcing apron seam-joined to a portion of the bottom cloth surrounding a hole for connecting an inflator to the air bag therethrough.

As described above, the outermost circumferential seam line of the reinforcing apron is substantially in a regular square, rhombic or rectangular form having ratios Da/Dw and Db/Dw in the range of from 0.6:1 to 0.9:1, and thus may be in a regular square or rhombic form in which Da=Db, or in a rectangular form in which Da≠Db. The four sides of the quadrilateral seam line is preferably in the form of a straight line as shown in FIG. 3, and may be slightly and smoothly curved outward as shown in FIG. 4 or inward (not shown in the drawings). However, the four curved sides never form a circle.

In the air bag of the present invention, the distances Da and Db correspond to 0.5 times, or less, the diameter De of the bottom cloth.

Referring to FIG. 3, a reinforming apron 6 cut in a circular form is seam-joined to a portion of an inside face of a bottom cloth 2 surrounding an inflator-connecting hole 5. An outermost circumferential seam line 14 of the reinforcing apron 6 is formed in a regular square inscribed in an imaginary circle 17 having a diameter Dw and drawn around a center point corresponding to that of the inflator-connecting hole 5. In this case, the lengths Da and Db of two pairs of sides of the square are equal to each other. Inside of the outermost circumferential seam line 14, a plurality of circular seam lines 7a, 7b and 7c are formed. In the air bag of FIG. 3, the ratios Da/Dw and Db/Dw are in the range of from 0.6:1 to 0.9:1. Also, the ratios of Da and Db respectively to the diameter De of the bottom cloth 2, namely Da/De and Db/De are 0.5 or less, preferably 0.2 to 0.4. In the air bag of FIG. 3, the ratio Da/De is equal to the ratio Db/De.

If the ratios Da/De and Db/De are more than 0.5, the burst strength-enhancing effect of the reinforcing apron becomes insufficient.

In an embodiment of the air bag of the present invention shown in FIG. 4, the outermost circumferential seam line 14 of the reinforcing apron 6 is substantially in a regular square, rhombic or rectangular form (a rectangular form in FIG. 4), and each side of the quadrilateral seam line is curved slightly outward.

Figure 5:
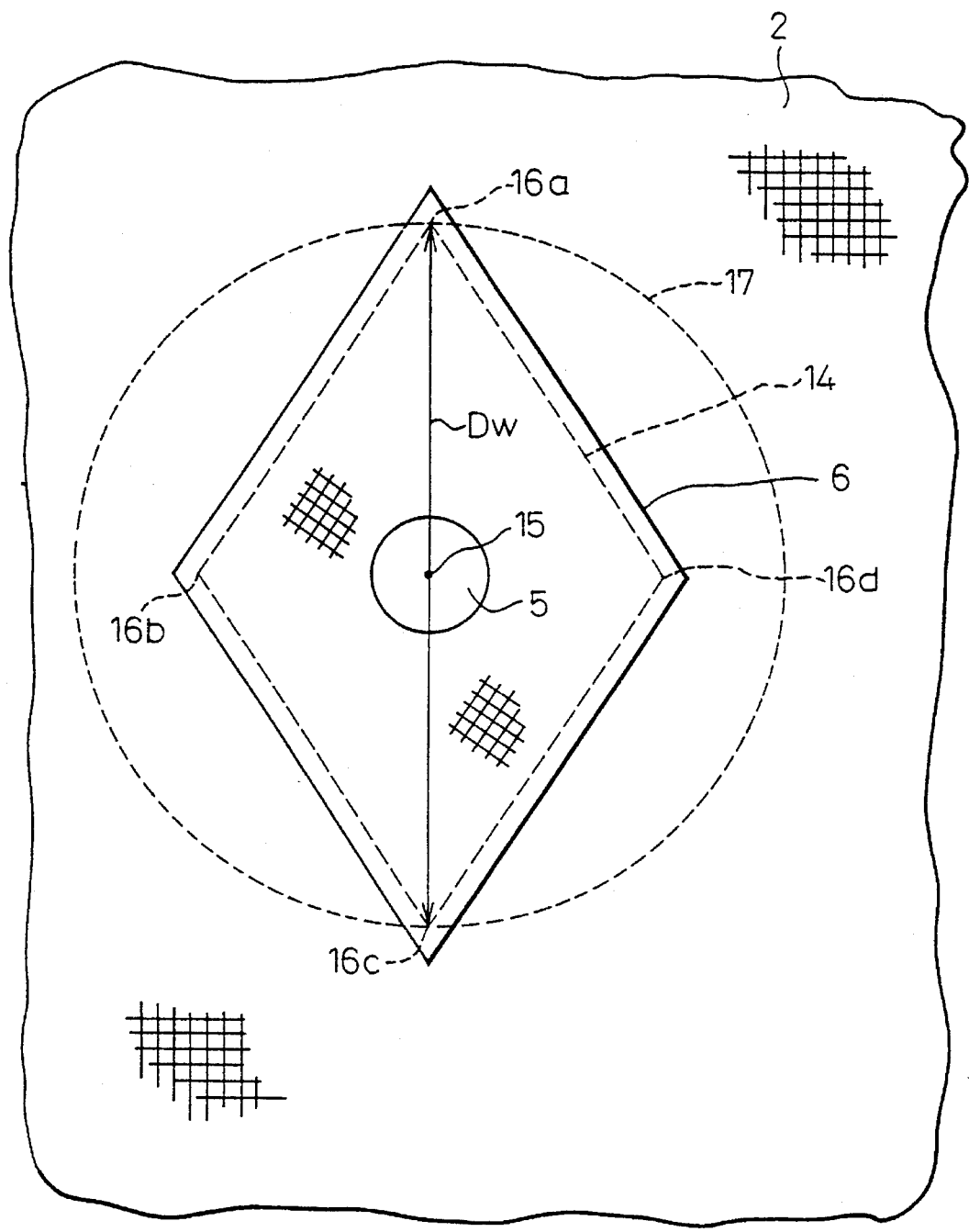
FIG. 5 is a schematic explanatory partial view of an inside back face of a bottom cloth of an embodiment of the air bag of the present invention in which the outermost seam line on a reinforcing apron seam-joined to a portion of the bottom cloth surrounding a hole for connecting an inflator to the air bag therethrough, is in the form of a rhombus.

In another embodiment of the air bag of the present invention shown in FIG. 5, the outermost circumferential seam line 14 of the reinforcing apron 6 is in the form of a rhombus and two vertexes 16a and 16c of the outermost circumferential rhombic seam line 14 are inscribed in the imaginary circle 17.

Figure 6:
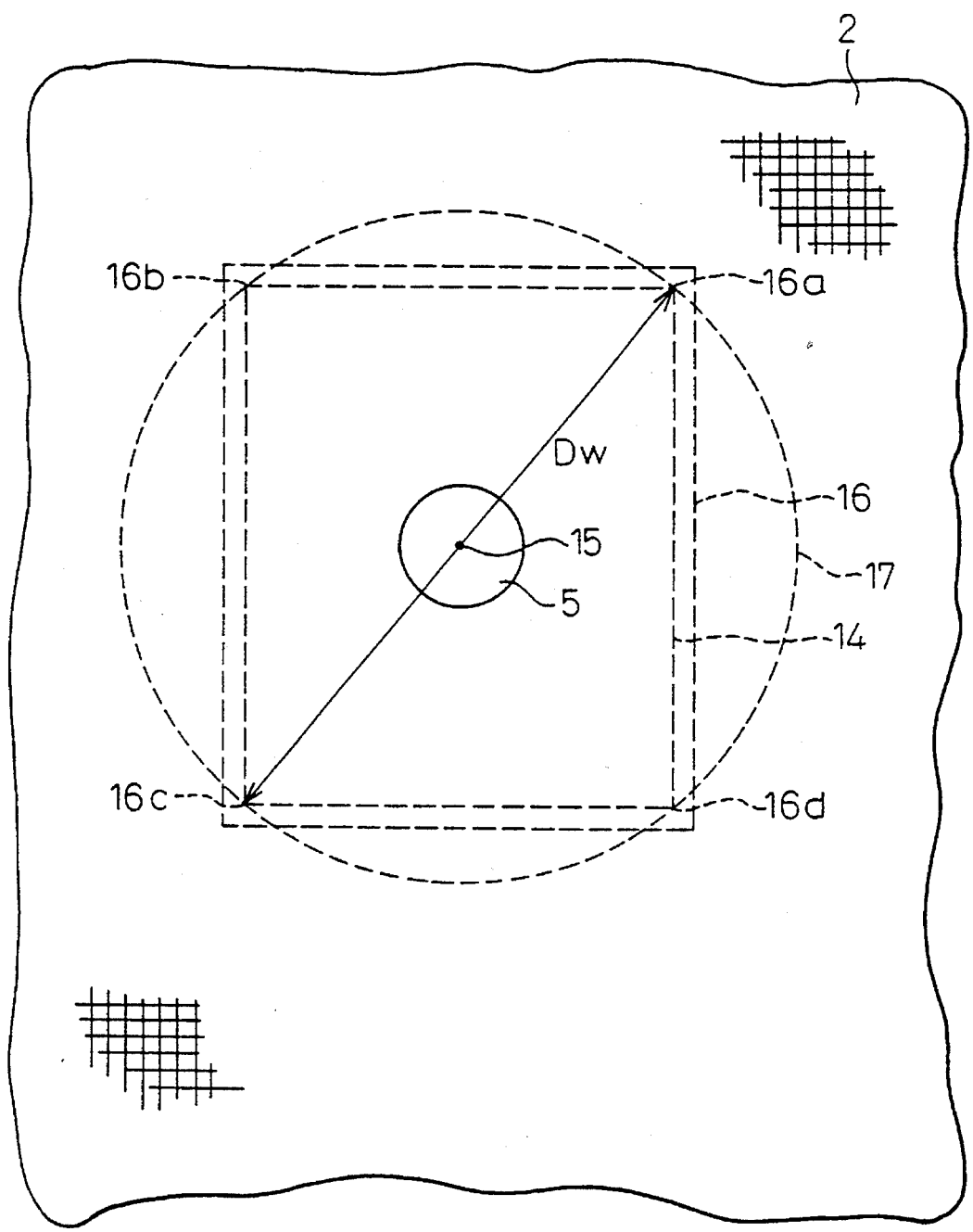
FIG. 6 is a schematic explanatory partial view of an inside back face of a bottom cloth of an embodiment of the air bag of the present invention in which the outermost seam line on a reinforcing apron, seam-joined to a portion of the bottom cloth surrounding a hole for connecting an inflator to the air bag therethrough, is in the form of a rectangle.

In another embodiment of the air bag of the present invention shown in FIG. 6, the outermost circumferential seam line 14 of the reinforcing apron 6 is in the form of a rectangle and four vertexes 16a to 16d of the outermost circumferential rectangular seam line 14 are inscribed in the imaginary circle 17.

In the air bag of the present invention, as mentioned above, it is preferable that the warp direction of the reinforcing apron intersects the warp direction of the bottom cloth and the intersecting angle thereof be 30 to 60 degrees, more preferably 40 to 50 degrees. In this case, it is naturally preferable that the weft direction of the reinforcing apron intersect the weft direction of the bottom cloth 2, and the intersecting angle thereof is #30 to 60 degrees, more preferably 40 to 50 degrees.

Where the reinforcing apron and the bottom cloth are arranged in the above-mentioned warp and weft directions, a bursting tension applied to the outermost circumferential seam portion of the reinforcing apron can be evenly distributed throughout the seam portion and thus the generation of the burst-starting points can be further effectively prevented.

The seam-joining for the reinforcing apron is carried out preferably at a stitching pitch of 1.0 to 3 mm. When the stitching pitch is less than 1.0 mm, the sewing operation becomes difficult and thus is carried out unevenly, and therefore the burst strength of the portion of the bottom cloth reinforced by the apron reduces. Also, when the stitching pitch is more than 3 mm, this excessively large stitching pitch causes the bursting tension to be concentrated in individual stitches and thus the burst strength of the air bag falls.

More preferably, the stitching pitch is 1.5 to 2.5 mm. In the seam-joining of the apron, at least the outermost circumferential seam on the apron preferably has the stitching pitch in the above-mentioned range to enhance the burst strength of the air bag. More preferably, the circumferential seams other than the outermost circumferential seam are formed at the above-mentioned stitching pitch.

The sewing yarns for the seam-joining of the reinforcing apron preferably have a high ultimate elongation and a low modulus. Particularly, nylon 66 sewing yarns having a thickness of 420 to 1,260 deniers are preferably used. Also, polyester sewing yarns are usable for the present invention.

In the present invention, the reinforcing apron is formed by superposing and seam-joining one piece or a plurality of pieces of a woven fabric to an inside face or outside face of a bottom cloth. Where the apron is formed from a plurality of woven fabric pieces superposed on each other, the above-mentioned specific features of the present invention must be satisfied by a woven fabric apron piece in which the outermost circumferential seam line is formed. Where the outermost circumferential seam line is formed on a plurality of woven fabric apron pieces, the burst strength of the outermost circumferential seam line portion can be further enhanced by making all the woven fabric pieces to satisfy the above-mentioned specific features of the present invention.

The woven fabric for the apron may be the same or different from the woven fabric for the bottom cloth. Generally, where the woven fabric for the apron is the same as that for the bottom cloth, an air bag having a high burst strength can be obtained.

The reinforcement by the apron in accordance with the present invention can be applied to a beltless air bag and to an air bag with belts. In the air bag with belts, the apron portion serves as a belt-catcher. Also, the apron and the belt may be formed of one and the same woven fabric.

With respect to fiber yarns for constructing the woven fabrics from which the bottom cloth, the top cloth (in the occupant side) and the aprons are formed, when the total thickness of the yarns is 150 to 550 deniers, a light weight, compact air bag can be obtained. If the total thickness of the yarns is more than 550 deniers, the resultant air bag is heavier and bigger and is uncomfortable to touch. Also, if the total thickness of the yarns is less than 150 deniers, the resultant air bag sometimes exhibits an unsatisfactory burst strength even when the above-mentioned improvement for seam-joining is applied. More preferably, the total thickness of the above-mentioned yarns is 200 to 450 deniers.

Where a thickness of the individual fibers of the yarns used for forming the aprons, the bottom cloth and the top cloth is more than 6 deniers, the resultant air bag is unpleasant to touch and where the individual fiber thickness is less than 0.5 denier, the resultant air bag exhibits a reduced burst strength even when the above-mentioned improvement for seam-joining is applied. Therefore, the individual fiber thickness is preferably 0.5 to 6 deniers, more preferably 1 to 3 deniers.

The bottom cloth and the top cloth of the air bag is preferably formed from a woven fabric not coated with a resin, namely a non-coated woven fabric. If a coated woven fabric is employed, the resultant air bag is heavy, exhibits a reduced compactness and is unpleasant to touch. Nevertheless, among the woven fabric pieces for forming the aprons, at least an apron woven fabric located closest to the inflator is preferably a coated woven fabric having a heat-resistant resin coating.

In the air bag of the present invention, the bottom cloth, the top cloth and the aprons are preferably formed from a woven fabric comprising polyester fibers and/or aramide fibers. When the polyester or aramide fiber woven fabric has the same basis weight as that of a nylon fiber woven fabric, since the polyester fibers and the aramide fibers have a larger specific gravity than that of the nylon fibers, the polyester or aramide fiber woven fabric has a reduced volume and thickness and an enhanced compactness in comparison with those of the nylon fiber woven fabric. Also, since the aramide fibers have a high tensile strength, it is possible to reduce the amount of the fibers to be used and to further reduce the weight and enhance the compactness of the resultant air bag.

The polyester fiber yarns usable for the air bag of the present invention are preferably polyester filament yarns. As a polyester for forming the polyester filaments, for example, a polyethylene terephthalate, polybutylene terephthalate, polyhexylene terephthalate, polyethylene naphthalate, polybutylene naphthalate, or polyethylene-1,2-bis(phenoxy- )ethane-4,4'-dicarboxylate can be used. As another polyester usable for the polyester filaments, a polyethylene isophthalate, a polybutylene terephthalate/naphthalate copolymer or a polybutylene terephthalate/decanedicarboxylate copolymer can be employed. Among the above-mentioned polyesters, the polyethylene terephthalate, which is fully balanced in high mechanical properties and fiber-forming property thereof, is preferably employed for the present invention.

The polyester filaments preferably have a dry heat shrinkage of 3 to 12% at a temperature of 150° C. If the dry heat shrinkage is higher than 12% at a temperature of 150° C., the resultant woven fabric exhibits a too large shrinkage due to a setting or calendering after scouring, and thus the even shrinkage of the fabric is rather restricted and gaps formed between the yarns in the fabric becomes large. Therefore, a woven fabric having a low air permeability and a high smoothness is not obtained. Also, if the dry heat shrinkage is less than 3%, it is impossible to produce a woven fabric having a low air permeability and a high smoothness, because the shrinkage of the resultant woven fabric due to the setting or calendering after scouring is too small. The dry heat shrinkage of the polyester filaments at a temperature of 150° C. is more preferably 4 to 11%.

Also, the polyester filaments preferably have a shrinkage of 1 to 7% in boiling water. If the boiling water shrinkage is more than 7%, the resultant woven fabric is shrunk during a scouring or setting procedure to an excessively large extent, and thus wrinkles are frequently generated on the fabric and calender processability of the fabric is reduced. Therefore, it is difficult to obtain a woven fabric having a low air permeability and a high smoothness. Also, in this case, when the woven fabric is stored for a long time, the airtightness and the smoothness of the fabric tend to become poor. If the boiling water shrinkage is less than 1%, the shrinkage of the resultant woven fabric during scouring or setting procedure is too low, and thus the resultant woven fabric does not exhibit a low air permeability and a high smoothness. The boiling water shrinkage of the polyester filaments is more preferably 1 to 6%.

The aramide fiber yarns usable for forming the bottom cloth, the top cloth and the aprons of the air bag of the present invention are preferably draw-cut fiber yarns consisting of blended polyester and aramide fibers or draw-cut fiber yarns consisting of aramide fibers alone as disclosed in Japanese Unexamined Patent Publication No. 3-287,832. Those fiber yarns enable the resultant woven fabric to exhibit a reduced air permeability and a high heat resistance to a high temperature inflation gas, and thus are useful for forming a non-coated air bag.

Particularly, the draw-cut fiber yarns have a large number of specific fluffs, and thus the resultant woven fabric exhibits an excellent filtering property. Therefore, the draw-cut fiber woven fabric is usable as a whole surface filter cloth for the inflator side of the air bag. To provide a satisfactory tensile strength, the draw-cut fiber yarns consisting of blended polyester and aramide fibers preferably have a total thickness of 100 to 420 deniers, more preferably 150 to 300 deniers. Also, the draw-cut fiber yarns consisting of aramide fibers alone preferably have a total thickness of 80 to 200 deniers, more preferably 100 to 150 deniers. Also, the draw-cut fibers in the draw-cut fiber yarns preferably have an average fiber length of 20 to 90 cm. Particularly, the aramide fibers are selected preferably from poly-p-phenylene terephthalamide fibers, and copoly-p-phenylene/3,4'-oxydiphenylene terephthalamide fibers.

Where the woven fabric for forming the air bag is non-resin coated (non-coated) polyester fiber woven fabric, the filament yarns contained as warp and weft yarns in the woven fabric preferably have a twist multiplier of 2,500 or less. In polyester fiber yarns having a thickness of 420 deniers, the twist multiplier of 2,500 corresponds to a twist number of 122 turns/m. When the twist multiplier is more than 2,500, in the resultant woven fabric, the air permeability of the resultant woven fabric is not satisfactorily reduced, the airtightness of the resultant air bag is low so that when inflated, the permeation of the inflation gas through the air bag is not satisfactorily restricted, and a perforation of the air bag occurs, and thus a risk of burning the occupants is increased. The twist multiplier of the warp and weft yarns are more preferably 2,050 or less. When the weft yarns are not twisted, the resultant woven fabric exhibits a reduced air permeability and thus is preferable. When non-twisted warp yarns are employed, the resultant woven fabric exhibits a reduced air permeability. However, the non-twisted warp yarns exhibit a reduced weaving processability. Preferably, the woven fabric exhibits a cover factor of 1,050 to 1,400 both in the warp and weft directions thereof. Also, it is preferable that the warp and weft densities of the woven fabric be equal to or close to each other. The cover factor of the woven fabric in the warp direction refers to a product of a square root of the thickness in denier of the warp yarns with a warp density in yarns/2.54 cm (inch). The cover factor of the woven fabric in the weft direction refers to a product of a square root of the thickness in denier of the weft yarns with a warp density in yarns/2.54 cm (inch). When the cover factor is less than 1,050, the resultant woven fabric exhibits an unsatisfactorily airtightness. Also, when the cover factor is more than 1,400, the resultant woven fabric exhibits a high stiffness and a bad touch, the airtightness of the fabric is not satisfactorily enhanced, and the non-smooth surface of the woven fabric exhibits a reduced adhesiveness. More preferable cover factor is 1,100 to 1,350.

In a particular woven fabric having an extremely high warp density and a reduced weft density, the apparent cover factor is reduced. However, in this type of woven fabric, the airtightness thereof is not satisfactorily high and the touch thereof undesirably becomes stiff. Also, this type of woven fabric exhibits an extremely reduced burst strength in one specific direction and thus is not suitable for the air bag.

The woven fabric for forming the air bag preferably has a tensile strength at break of 180 kg/3 cm or more, and a tensile elongation at break of 25% or more. When the tensile strength at break is less than 180 kg/3 cm, the resultant air bag exhibits an unsatisfactory burst strength. More preferably, the woven fabric has a tensile strength at break of 200 kg/3 cm or more.

When the tensile elongation at break is less than 25%, the resultant air bag exhibits an unsatisfactory burst strength. A more preferable tensile elongation at break is 27% or more.

In the woven fabric for the air bag, preferably the yarns drawn out from the woven fabric exhibit a tensile strength at break of 8.0 g/denier or more, and a tensile elongation at break of 18% or more. When the tensile strength at break of the draw-taken yarns is less than 8.0 g/denier, the air bag exhibits a reduced resistance to bursting upon crashing. A more preferable tensile strength at break of the yarns is 8.3 g/denier or more.

Also, when the tensile elongation at break of the yarns drawn out from the woven fabric is less than 18%, the air bag exhibits a reduced resistance to bursting upon inflating. A more preferable tensile elongation at break of the yarns is 20% or more.

The woven fabric made from the above-mentioned polyester filament yarns preferably has a weave structure of a 1/1 plain weave or a 2/2 mat weave; and may be a 2/1 or 2/2 twill weave.

The (non-coated) polyester woven fabric not coated with a resin can be obtained by applying a calender treatment to the polyester woven fabric in such a manner that at least one surface of the woven fabric is brought into contact with a metal roll in the calendering machine. The metal roll preferably has preferably a surface temperature of 150° to 220° C., more preferably 160° to 200° C. The calendering treatment is carried out preferably under a roll pressure of 500 kg/cm or more, more preferably 550 to 1,000 kg/cm at a roll speed of 1 to 50 m/min., more preferably 2 to 25 m/min. In this calendering treatment, to obtain a satisfactory heat-pressing effect, the woven fabric is preferably pre-heated or calendered at a low speed. The calendering treatment is carried out at least once, or 2 times or more.

The non-coated polyester woven fabric preferably exhibits an air permeability of 0.01 to 0.4 ml/cm$^2$/sec./0.5 inch Aq determined by the Frasil method. When the air permeability is more than 0.4 ml/cm$^2$/sec./0.5 inch Aq, the resultant air bag exhibits a reduced airtightness and has a high of breaking upon inflating. Therefore, the risk of the occupants's face being burned by the high temperature gas is increased. Also, the high air permeability causes the control of the inside pressure of the air bag only by the vent holes to be difficult. Also, if the air permeability is less than 0.01/ml/cm$^2$/sec./0.5 inch Aq, the fiber packing of the resultant woven fabric becomes excessively high, the tear strength of the woven fabric reduces and as a result, the burst strength of the woven fabric reduces. A more preferable air permeability is 0.02 to 0.3 ml/cm$^2$/sec./0.5 inch Aq.

The fiber packing of the non-coated polyester woven fabric is represented by a value in % of a quotient of a bulk specific gravity by a true specific gravity of the woven fabric. Preferably, the fiber packing is 70 to 85%. When the fiber packing is less than 70%, the resultant air bag is easily perforated upon inflating, the inflation gas easily permeates through the air bag and thus the safety of the occupant cannot be preserved by the air bag. Also, when the fiber packing is more than 85%, the resultant woven fabric is stiff and exhibits a poor touch and a reduced tear strength, and therefore the resultant air bag is easily perforated upon inflating, and exhibits a low burst strength. A more preferable fiber packing is 72% to 80%.

In the air bag of the present invention, the reinforcing aprons are preferably formed from a woven fabric coated or impregnated with a silicone rubber or a chloroprene rubber. This is because the rubber coating can effectively cut off the high temperature gas upon inflating. Among the rubber materials, as a silicone rubber, an addition reaction type silicone rubber containing a catalyst is preferably utilized. Particularly, dimethyl silicone, methylvinyl silicone methylphenyl silicone and fluorosilicone rubbers can be used. Among the above-mentioned silicone rubbers, the methyl silicone, which has excellent mechanical properties, a low price and high working properties, is more preferably used. The silicone rubber optionally contains a flame retardant, an inorganic additive such as silica and a filler.

In the air bag of the present invention, by forming the outermost circumferential seam line into a quadrilateral form such as a regular square, rhombic or a rectangle form, preferably into a substantially a regular square form; by arranging the direction of at least one pair of diagonal lines of the outermost circumferential quadrilateral seam line substantially in parallel to the warp or weft direction of the bottom cloth; and by controlling the straight line length Da and Db of two sides of the outermost circumferential quadrilateral seam line adjacent to each other respectively to a value corresponding to 0.6 to 0.9 time of the diameter Dw of the imaginary circle, the tension applied to the seam portion of the apron can be evenly borne by each of seam points, a local load of excessive tension can be prevented, and thereby the burst strength of the resultant air bag can be enhanced.

Further, by controlling the Da and Db value of the outermost circumferential seam line to a level of 0.5 times, or less, of the diameter De of the bottom cloth, the burst strength of the air bag can be further enhanced. Since the air bag of the present invention is reinforced at the outermost circumferential seam line of the apron in the above-mentioned manner, the air bag of the present invention has a significant burst strength in comparison with that of the conventional air bag as shown in FIG. 1 wherein the outermost circumferential seam line of the apron corresponds to a concentric circular seam line of the bottom cloth. The seam lines of the apron of the conventional air bag effectively prevent the perforation of the air bag upon inflating. However, the conventional air bag is unsatisfactory in the burst strength thereof.

EXAMPLES

The present invention will be further explained by way of the following specific examples.

In the examples, the burst strength of the air bag was measured in accordance with the following test method.
Burst Strength The burst strength (kg/cm$^2$G) of a 60 liter air bag was measured by rapidly blowing a high pressure nitrogen gas thereinto at room temperature. Also, it was observed whether or not the bag was damaged.

Examples 1 to 8

In each of Examples 1 to 8, the polyester filament yarns (trademark: Tetoron, made by Teijin Limited), nylon 66 filament yarns (made by Akzo), draw-cut fiber yarns consisting of a blend of aramide fibers (trademark: Technora, made by Teijin Limited) with polyester fibers or draw-cut fiber yarns consisting of the above-mentioned aramide fibers, each having the physical properties as shown in Table 1 were converted to a plain weave. The resultant woven fabric was subjected to a scouring step and then a heat-setting step. The above-mentioned polyester filament woven fabric was calendered on one surface thereof to provide an airtight woven fabric.

A portion of the polyester woven fabric was coated with a silicone rubber in a coating amount of 40 g/m$^2$.

The above-mentioned woven fabric was used to provide a 60 liter air bag for a driver seat. In the air bag, a portion of a bottom cloth surrounding an inflator was seam-joined with reinforcing aprons consisting of the same woven fabric as that of the bottom cloth. A silicone rubber-coated polyester woven fabric was arranged to form an innermost layer of the laminated apron without seam-joining. The innermost layer served as a heat-sealed layer for the inflator.

The draw-cut fiber woven fabric was used as a filter cloth for forming the entire inflator side face of the air bag. The constitution details, burst strengths and general evaluation results of the top cloths, the bottom cloths and the apron reinforcing structures of the air bags are shown in Table 1.

t,0250

Comparative Examples 1 to 7

In each of Comparative Examples 1 to 7, a 60 liter air bag was produced by the same procedures as in Examples 1 to 8, except that the outermost circumferential seam line was formed as indicated in Table 2. The reinforcing apron was seam-joined to a portion of the bottom cloth surrounding the inflator in the same manner as mentioned above.

The draw-cut fiber woven fabrics were employed as a filter cloth from which the entire inflator-side face of the air bag was formed.

The constitution details, burst strengths and general evaluation results of the top cloths, the bottom cloths and the apron-reinforcing structures of the comparative air bags are shown in Table 2.

with an apron having an inflator-connecting hole, said apron being made from a woven fabric piece seam-joined to the bottom cloth by circumferential seam lines wherein an outermost circumferential seam line on the apron is in a quadrilateral form selected from substantially regular square, rhombic and rectangular forms, said quadrilateral form having vertexes and having the same center point as that of the inflator-connecting hole; the outermost circumferential seam line having a pair of sides extending in parallel to each other and substantially parallel to the direction of the warp yarns or the weft yarns in the bottom cloth and satisfying the requirements that:

(1) when an imaginary circle having a diameter Dw is drawn around the same center point as that of the inflator-connecting hole on the apron in such a manner that at least one pair of vertexes of the outermost circumferential seam line, spaced at a largest diagonal

TABLE 2

| Comparative Example No. | Comparative Example | | | | | | |
|---|---|---|---|---|---|---|---|
| Item | 1 | 2 | 3 | 4 | 5 | 6 | 7 |
| Top cloth | | | | | | | |
| Type of yarns | Polyester filament yarn | Polyester filament yarn | Polyester filament yarn | Polyester filament yarn | Polyester filament yarn | Polyester filament yarn | Polyester filament yarn |
| Total yarn thickness (d)/individual filament thickness (d) | 420/1.7 | 420/1.7 | 420/1.7 | 420/1.7 | 210/1.7 | 210/1.7 | 210/1.7 |
| Coating | None | None | None | None | Coated | None | None |
| Basis weight (g/m$^2$) | 237 | 237 | 237 | 237 | 231 | 188 | 188 |
| Thickness (mm) | 0.219 | 0.219 | 0.219 | 0.219 | 0.218 | 0.176 | 0.176 |
| Bottom cloth | | | | | | | |
| Type of yarns | Polyester filament yarn | Polyester filament yarn | Polyester filament yarn | Polyester filament yarn | Draw-cut polyester/aramide blend fiber yarn | Draw-cut polyester/aramide blend fiber yarn | Draw-cut aramide fiber yarn |
| Total yarn thickness (d)/individual filament thickness (d) | 420/1.7 | 420/1.7 | 420/1.7 | 420/1.7 | 300/1.0 | 300/1.0 | 300/1.0 |
| Coating | None | None | None | None | None | None | None |
| Basis weight (g/m$^2$) | 237 | 237 | 237 | 237 | 230 | 230 | 135 |
| Thickness (mm) | 0.219 | 0.219 | 0.219 | 0.219 | 0.234 | 0.234 | 0.116 |
| Apron reinforcing structure | | | | | | | |
| The number of apron woven fabric pieces | 2 | 2 | 2 | 2 | 2 | 2 | 2 |
| The form of outermost circumferential seam line | Circle | Quasi circle | Circle | Regular square | Circle | Quasi circle | Circle |
| Da/Dw, Db/Dw | 1.0 | 1.20 | 1.00 | 0.71 | 1.00 | 1.20 | 1.00 |
| Da/De, Db/De | 0.55 | 0.55 | 0.33 | 0.60 | 0.55 | 0.55 | 0.55 |
| The angle between warp direction of apron woven fabric and warp direction of bottom cloth woven fabric (degree) | 0 | 0 | 45 | 45 | 0 | 0 | 0 |
| Stitching pitch (mm) of apron | 3.5 | 3.5 | 2.0 | 2.0 | 3.5 | 3.5 | 3.5 |
| Burst strength of air bag (kg/cm$^2$G) | 1.1 | 1.0 | 1.2 | 1.2 | 1.0 | 0.9 | 1.2 |
| General evaluation | Bad | Bad | Bad | Bad | Bad | Bad | Bad |

The air bag of the present application exhibits an excellent burst strength and a high degree of safety when inflated and thus has considerable industrial applicability.

We claim:

1. A beltless air bag with a high burst strength comprising a circular bottom cloth and a circular top cloth each formed from a woven fabric piece, having warp yarns and weft yarns superposed on each other and seam-joined to each other at a circumferential edge portion thereof, the circular bottom cloth having an inflation connecting hole formed in a center portion thereof through which an inflator can be connected to the air bag and having a circumferential portion thereof surrounding the inflator-connecting hole reinforced distance from each other, is inscribed in the imaginary circle, a ratio of each of straight line distances Da and Db between one of the vertexes inscribed in the imaginary circle and each of two vertexes adjacent to said one of the vertexes to the diameter Dw of the imaginary circle is in a range of from 0.6:1 to 0.9:1; and (2) a ratio of each of the distances Da and Db to a diameter De of the circular bottom cloth is 0.5:1 or less.

2. The air bag as claimed in claim 1, wherein the outermost circumferential seam line on the apron is in the form selected from the group consisting of a substantially regular square or a rhombus inscribed in the imaginary circle and the distances Da and Db are equal to each other.

3. The air bag as claimed in claim 1, wherein the outermost circumferential seam line on the apron is substantially in the form of a rectangle inscribed in the imaginary circle, and the distances Da and Db are different from each other.

4. The air bag as claimed in claim 1, wherein the woven fabric piece, from which the apron is formed, has a warp direction intersecting the warp direction of the woven fabric piece, from which the bottom cloth is formed at a bias angle.

5. The air bag as claimed in claim 4, wherein the bias angle is 30 to 60 degrees.

6. The air bag as claimed in claim 1, wherein the outermost circumfertial seam line on the apron has a stitching pitch of 1.0 to 3 mm.

7. The air bag as claimed in claim 1, wherein the woven fabric piece, from which the bottom cloth is formed, is formed from yarns having a thickness of 150 to 550 denier, and is free from a resin coating.

8. The air bag as claimed in claim 1, wherein the apron and the bottom cloth are respectively and independently from each other formed from a woven fabric made from at least one type of fibers selected from polyester fibers and aramide fibers.

9. The air bag as claimed in claim 1, wherein the ratio of each of Da and Db to Dw is in the range of from 0.65:1 to 0.85:1.

* * * * *

UNITED STATES PATENT AND TRADEMARK OFFICE
CERTIFICATE OF CORRECTION

PATENT NO. : 5,470,106
DATED : November 28, 1995
INVENTOR(S) : Kunio Nishimura, Hideo Nakagawa, Nobuo Takahashi It is certified that error appears in the above-identified patent and that said Letters Patent is hereby corrected as shown below:

Column 13,
Line 1: delete "t.0250" and insert Table 1, as shown in the attached copy.

Signed and Sealed this

Twenty-eighth Day of August, 2001

*Attest:*

NICHOLAS P. GODICI
*Attesting Officer*    *Acting Director of the United States Patent and Trademark Office*